United States Patent [19]

Hawkes, Jr. et al.

[11] 4,020,400
[45] Apr. 26, 1977

[54] INTEGRATED CIRCUIT BREAKER PANELBOARD

[75] Inventors: George F. Hawkes, Jr., LaPalma, Calif.; Willis A. Speck, Trumbull, Conn.

[73] Assignee: Westinghouse Electric Corporation, Pittsburgh, Pa.

[22] Filed: Sept. 30, 1975

[21] Appl. No.: 618,099

Related U.S. Application Data

[63] Continuation of Ser. No. 488,605, July 12, 1974, abandoned.

[52] U.S. Cl. .............................. 361/353; 200/293
[51] Int. Cl.² .................................... H02B 1/04
[58] Field of Search ............... 339/22 B, 198 N; 317/112, 117, 119, 18 D; 200/49, 50 A, 50 C, 162, 280, 293, 294, 307; 335/18

[56] References Cited

UNITED STATES PATENTS

| 2,707,761 | 5/1955 | Page | 317/119 |
| 2,908,782 | 10/1959 | Kiesel | 200/88 |
| 3,743,891 | 7/1973 | Buxton | 317/119 |
| 3,769,553 | 10/1973 | Coley | 317/119 |

Primary Examiner—Gerald P. Tolin
Attorney, Agent, or Firm—L. P. Johns

[57] ABSTRACT

An integrated panelboard and circuit breaker system characterized by a panelboard and at least one circuit breaker, the panelboard having spaced line and neutral bus bars, the bus bars having stab terminals, the circuit breaker having neutral and line stab-receiving receptacles contained within corresponding openings in the housing of the circuit breaker.

2 Claims, 4 Drawing Figures

INTEGRATED CIRCUIT BREAKER PANELBOARD

This is a continuation of application Ser. No. 488,605 filed July 12, 1974, now abandoned.

BACKGROUND OF THE INVENTION

1. Field of the Invention

This invention relates to electric distribution systems and, more particularly, to an electric panelboard in which bus bars are provided with stab terminals located for easy detachable mounting of one or more circuit breakers.

2. Description of the Prior Art

In the past, circuit breakers for mounting on panelboards have been provided with a neutral wire for separate connection to a neutral bus bar on the panelboard. Such a construction, not only adds to the cost of the panelboard-circuit breaker combination, but also results in wiring inconvenience when the circuit breaker is attached to or dismounted from the panelboard.

SUMMARY OF THE INVENTION

In accordance with this invention it has been found that an integrated panelboard and circuit breaker system can be provided which is less costly and more convenient to use. The system comprises a panelboard and at least one circuit breaker; the panelboard comprising spaced line and neutral bus bars and a load conductor; the circuit breaker comprising a neutral terminal, a load terminal, and a line terminal; the neutral terminal bus bar comprising a stab terminal and a neutral terminal comprising a stab-receiving receptacle; the circuit breaker comprising a housing having opening means corresponding to the locations of the neutral and blind terminals through which the neutral stab extends for connection with the neutral stab-receiving receptacle.

The advantage of the integrated panelboard and circuit breaker system of this invention is that it incorporates a neutral terminal within the circuit breaker to provide cost savings and wiring convenience.

DESCRIPTION OF THE PREFERRED EMBODIMENT

Figure 1:
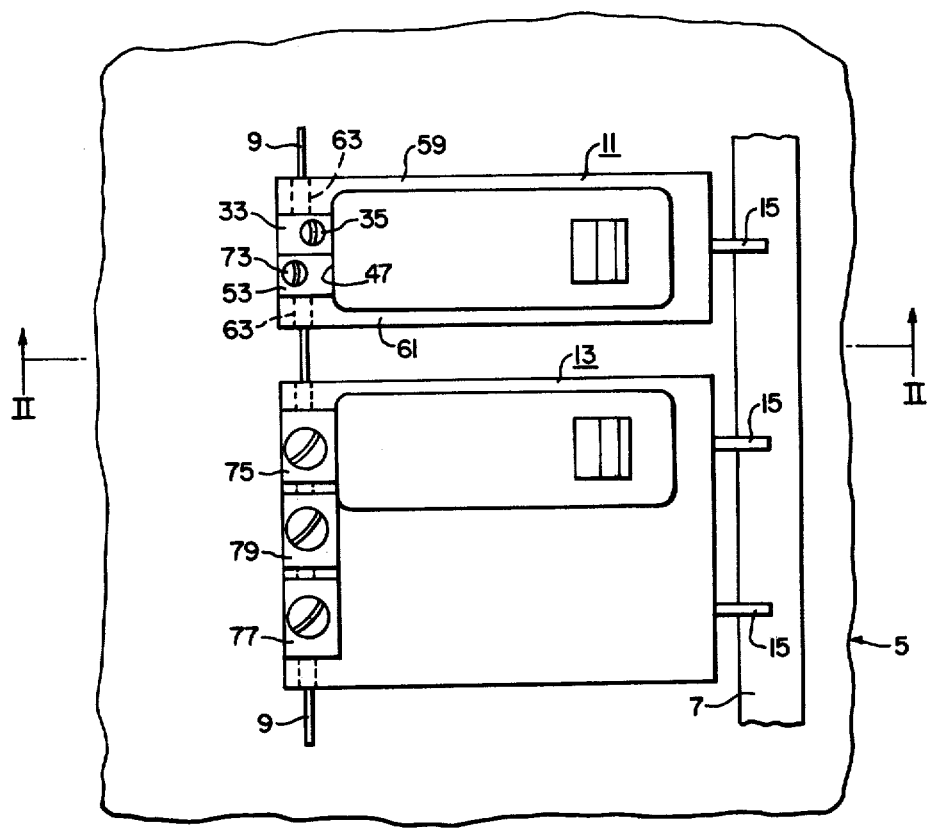
FIG. 1 is a plan view of a portion of a panelboard and circuit breakers mounted thereon.

In FIG. 1, a portion of a panelboard or service panel is generally indicated at 5 and it comprises a pair of bus bars including a line bus bar 7 and a neutral bus bar 9. A pair of circuit breakers comprising, for example, a single pole breaker 11 and a two-pole breaker 13 are mounted upon and disposed between the bus bars 7 and 9. For that purpose the line bus bar 7 is provided with spaced stabs or stab terminals 15 which, as shown more particularly in FIG. 2, extends substantially perpendicular to the line bus bar 7.

Figure 2:
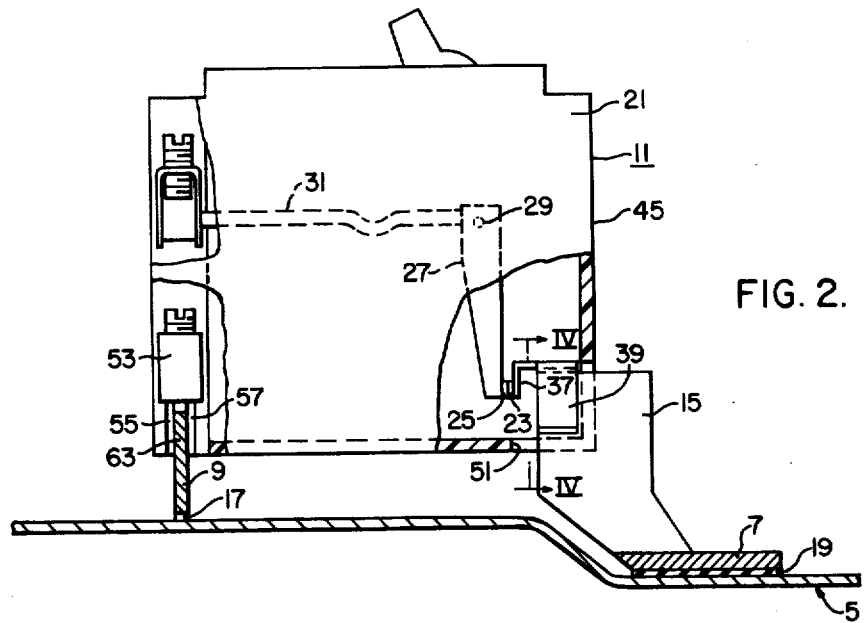
FIG. 2 is a vertical sectional view taken on the line II—II of FIG. 1.

The neutral bus bar, as shown in FIGS. 1 and 2, extends vertically from the panelboard 5. Manifestly, suitable insulation means such as insulators 17 and 19 are provided between the respective bus bars 9 and 7 and the panelboard 5.

Although the circuit breakers 11 and 13 are single and two-pole structures respectively, their basic operation is similar. For a general description of circuit breakers, reference is made to U.S. Pat. No. 3,745,414. For the purpose of this invention, however, a limited description of the operation and construction of the circuit breaker is provided. The single pole circuit breaker 11, for example, comprises a housing 21 in which the operating parts of the circuit breaker are contained. The operating parts include a stationary contact 23, a movable contact 25, operating means including a contact arm 27 which is pivotally mounted at 29 which is connected by conductor means such as a conductor 31 to a load terminal 33. The terminal 33 includes clamping means such as a screw 35 for engaging the end portion of a conductor such as a wire (not shown) leading to a particular load center in a conventional manner.

Figure 4:
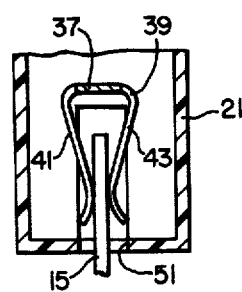
FIG. 4 is a vertical sectional view taken on the line IV—IV of FIG. 2.

As shown in FIG. 2, the stationary contact 23 is mounted on a conductor 37 which comprises a plug-in type line terminal structure or clip 39 which consists of a pair of inwardly tapered clamping arms 41, 43 (FIG. 4) for engaging the stab 15 in a detachable manner. For that purpose the housing 21 which includes opposite end walls 45, 47 as well as a bottom edge wall 49, has opening means or an aperture 51 in the portions of the end wall 45 and bottom edge wall 49 forming a corner of the housing. The aperture 51 is substantially aligned with the center line of the terminal structure or clip 39, whereby the stab 15 is insertable into the aperture and the clip 39 as shown in FIG. 4. Thus the terminal structure or clip 39 is contained within the housing 21 and adapted for easy engagement with the stab 15.

In accordance with this invention, the circuit breaker 11 is also provided with a load neutral terminal 53 by which the circuit breaker is electrically connected to the neutral bus bar 9. As shown in FIG. 2 the neutral terminal 53 is a clip-on type structure similar to the clip 39 and comprises a pair of arms 55 and 57 which clampingly engage or clip onto the generally vertical neutral bus bar 9. As shown in FIG. 1, the housing 21 of the circuit breaker also comprises a pair of opposite side walls 59, 61 which extends beyond the end wall 47 to enclose the load terminal 33 and the neutral terminal 53. Aperture means or slots 63 are provided at the lower ends of the side walls 59, 61. Thus the upper edge portion of the neutral bus bar 9 is located in the slot 63 when engaged by the clamping arms 55, 57 of the neutral terminal 53.

Figure 3:
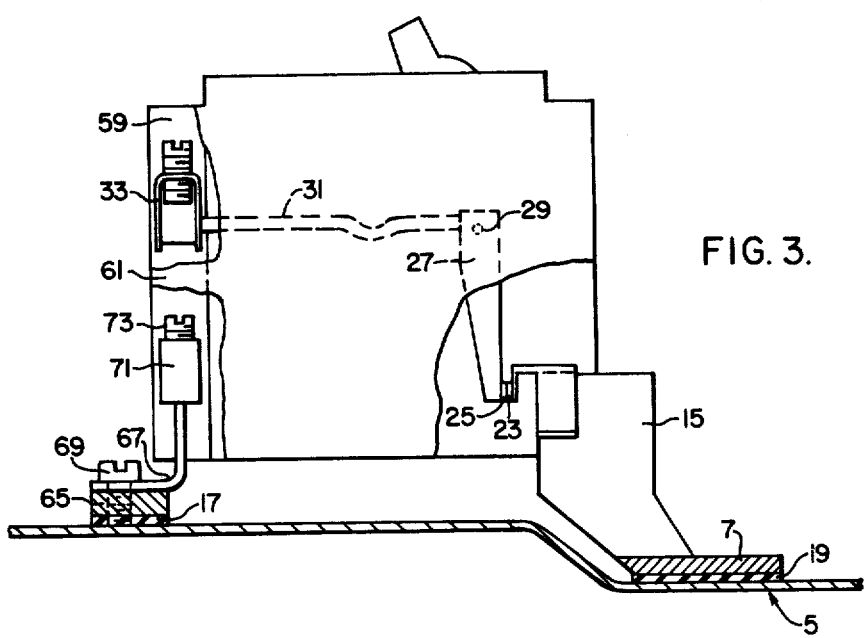
FIG. 3 is a vertical sectional view of another embodiment of the device shown in FIG. 2.

Another embodiment of the invention is shown in FIG. 3 in which all parts similar to those of FIG. 2 include corresponding reference numbers. The primary difference between the embodiments of FIGS. 2 and 3 is a neutral bus bar 65 (FIG. 3) which is provided with an L-shaped conductor 67 the lower portion of which is electrically secured to the bus bar 65 in a suitable manner such as by a screw 69. The upright portion of the conductor 67 extends through the opening between the opposite walls 59, 61 and engages a neutral terminal 71 where it is clamped in place by a set screw 73.

As shown in FIG. 1 the two-pole circuit breaker 13 differs from the single pole circuit breaker 11 in that it is provided with two load terminals 75, 77 similar to the load terminal 33. In addition, the circuit breaker 13 includes a single neutral terminal 79 which is similar in construction to the neutral terminal 53 or 71.

In conclusion, the integrated panelboard and circuit breaker system of this invention provides a combination wherein neutral solderless terminals are disposed within the circuit breaker housing as part of a complete circuit breaker. By such construction, a circuit breaker is physically supported at one end on a line bus stab and at the other end on a neutral bus. By providing a circuit breaker with means for being plugged onto two-spaced bus bars several advantages are obtained. First, both load wires are brought to a common termination area for easy wiring and quick identification when reworking. Second, the size of the wire termination for the neutral connection by its location and construction is matched to its requirement, namely, the circuit breaker. Third, since the neutral terminal is provided only with the breaker, the result is fewer terminals supplied by the manufacturer. Finally, the usual "pan" type of panel board is eliminated since the bus bars support the breaker and no purely mechanical support is necessary.

What is claimed is:

1. An integrated panelboard and circuit breaker system for connection to load conductors comprising a panelboard and at least one circuit breaker, the circuit breaker comprising a neutral terminal clip, a load conductor having a load terminal and a line terminal clip, the load conductor being releasably connected to the line terminal, the circuit breaker also comprising a housing including a bottom edge wall and opposite end walls, the bottom edge wall and one end wall forming a first housing corner and having a first opening extending through the corner portions of the bottom edge and end walls, the bottom edge wall and the other end wall also forming a second housing corner and having a second opening extending through the corner portions of the bottom edge wall and other end wall; the panelboard comprising a line bus bar and a neutral bus bar, each line and neutral bus bar having spaced stab terminals, the stab terminals being planar and disposed in a plane normal to the longitudinal axis of the bus bars, the line and neutral terminal clips being located within the housing and aligned with the corresponding openings and being detachably connected to one stab terminal of the line bus bar and to one stab terminal of the neutral bus bar, said stab terminals extending into the openings of the housing, and the detachable connections between the stab terminals and the clips comprising the only mounting means of the circuit breaker on the panelboard.

2. The integrated panelboard and circuit breaker system of claim 1 in which the line bus bar is a ribbon-like member with the broad side mounted flat on the panelboard.

* * * * *